(No Model.)

C. K. PADDOCK.
TWO WHEELED VEHICLE.

No. 278,358. Patented May 29, 1883.

Witnesses:
Thos. Houghton.
Will H. Coulter

Inventor:
Charles K. Paddock,
per Voorhees & Singleton.
Attys.

UNITED STATES PATENT OFFICE.

CHARLES K. PADDOCK, OF ST. LOUIS, MISSOURI.

TWO-WHEELED VEHICLE.

SPECIFICATION forming part of Letters Patent No. 278,358, dated May 29, 1883.

Application filed March 19, 1883. (No model.)

*To all whom it may concern:*

Be it known that I, CHARLES K. PADDOCK, of the city of St. Louis, and State of Missouri, have invented certain new and useful Improvements in Two-Wheeled Vehicles; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1:
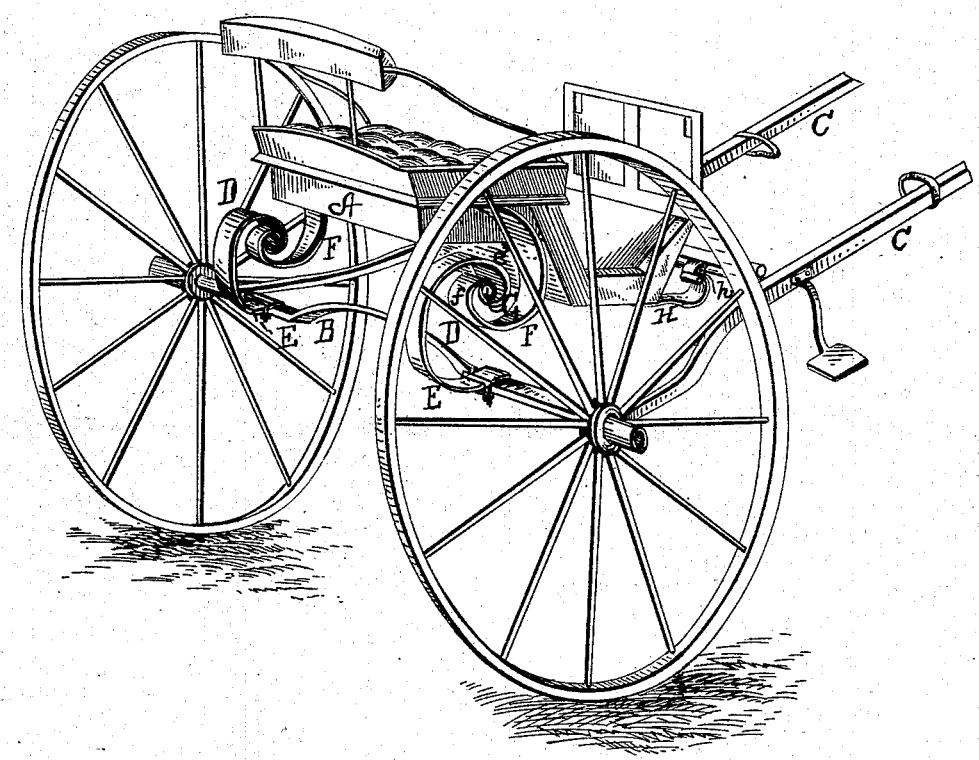
Figure 2:
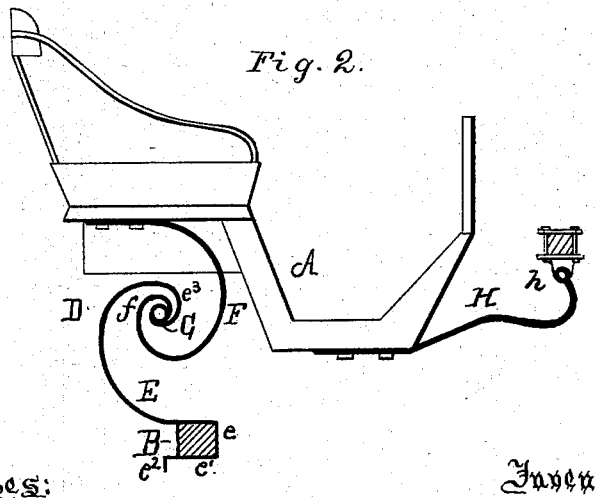

Figure 1 is a perspective view of a cart provided with the invention. Fig. 2 is a side view of the same.

This invention relates to improvements in two-wheeled vehicles commonly known as "village carts."

The object of the invention is to produce an easy-riding vehicle in which the motion of the horse will not be conveyed to the body of the vehicle.

The invention consists in the construction hereinafter set forth.

In the annexed drawings, the letter A indicates the body, B the axle, and C C the shafts, of a two-wheeled vehicle or "cart." Secured to the axle near its ends are the rear body-supporting springs, D D, consisting of two parts, E and F. The main part E has its lower end, $e$, turned upon itself, forming a lip, $e'$, with a downturned end, $e^2$. This end $e$ is placed over the axle and secured by a clip, the spring extending to the rear, and then being curved upward to the front. At its upper end, $e^3$, this part E is connected by the joint G to the end $f$ of the other part or hanger, F, of the spring. This joint in the present instance is made by forming the two ends into eyes, one around the other, and passing a headed bolt through, which keeps them from slipping apart. The hanger F is curved upward and backward, and is secured to the underneath side of the rear of the body. The body A "drops" and is secured at its front end to the plate-springs H, which are fastened to the body at one end, and are connected to the splinter-bar by joints $h$. It will be seen that not only has the body an elastic support upon its springs, but by the joints G G and $h\ h$ it has a fine yielding motion, and said springs have more freedom than simply a yielding in the metal which composes them. As the shafts which are connected to the axle move up and down in traveling, the front springs, H H, not only relieve the motion, but the joints G G allow the springs D to come into play, the hangers F yielding, and at the same time inducing an elasticity in the lower part, E. In this device the springs D and H not only serve to relieve the weight of the occupants in passing over rough places, but by the use of the joints sufficient delicacy is given to the rear springs, that they are made to assist in counteracting the movements which would otherwise be imparted by the horse. The shafts C C, instead of having the usual upward curve at the axle, are curved downward, as shown at $c\ c$, which renders the cart easy of access, as there is no danger of striking the shafts.

I am aware that two-wheeled vehicles have been devised in which the front of the body is connected to the shafts by a spring, and also that curved springs have been employed to support the rear end of the body, and I lay no broad claim to any such construction.

Having thus described my invention, what I claim is—

1. In a two-wheeled vehicle or cart, the axle and shafts secured to the axle, in combination with the body, and the springs D, consisting of the upper and lower parts, F E, connected by the joint G, the said springs being interposed between the axle and the rear of the body, and the front of the latter being supported by the shafts, as set forth.

2. The combination of the body A, axle B, the rear springs, D, composed of the parts E and F, connected by the joints G, with the shafts C C, and the front spring, H, having the joints $h$, substantially as set forth.

In testimony that I claim the foregoing as my own I affix my signature in presence of two witnesses.

CHARLES K. PADDOCK.

Witnesses:
A. B. GIVENS,
E. RONNAR.